(12) United States Patent
Kwasniewski et al.

(10) Patent No.: US 9,103,433 B2
(45) Date of Patent: Aug. 11, 2015

(54) AXLE ASSEMBLY AND METHOD OF LUBRICATION CONTROL

(71) Applicant: ArvinMeritor Technology, LLC, Troy, MI (US)

(72) Inventors: Dale L. Kwasniewski, Galesburg, MI (US); Larry Wagle, Boyne Falls, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 201 days.

(21) Appl. No.: 13/777,274

(22) Filed: Feb. 26, 2013

(65) Prior Publication Data

US 2014/0243137 A1     Aug. 28, 2014

(51) Int. Cl.
*F16H 57/04*       (2010.01)

(52) U.S. Cl.
CPC ........ *F16H 57/0445* (2013.01); *F16H 57/0483* (2013.01)

(58) Field of Classification Search
CPC .......................... F16H 57/0483; F16H 57/0445
See application file for complete search history.

(56) References Cited

U.S. PATENT DOCUMENTS

| | | | |
|---|---|---|---|
| 1,243,720 A | 10/1917 | Eidson | |
| 3,470,767 A * | 10/1969 | Gray | 475/160 |
| 3,645,153 A | 2/1972 | Northcraft | |
| 4,046,210 A | 9/1977 | Nelson | |
| 4,754,847 A | 7/1988 | Glaze et al. | |
| 5,711,389 A | 1/1998 | Schlosser | |
| 5,839,327 A * | 11/1998 | Gage | 74/607 |
| 6,427,640 B1 | 8/2002 | Hickey et al. | |
| 6,997,841 B2 | 2/2006 | Wagle et al. | |
| 2003/0019672 A1 | 1/2003 | Borgen et al. | |
| 2006/0089226 A1 | 4/2006 | Garcia et al. | |
| 2006/0272866 A1 | 12/2006 | Ziech | |
| 2006/0276297 A1 | 12/2006 | Ziech | |
| 2009/0191060 A1 | 7/2009 | Bagepalli et al. | |
| 2010/0248888 A1 | 9/2010 | Hamperl et al. | |
| 2011/0024236 A1 * | 2/2011 | Yano et al. | 184/6.12 |
| 2011/0111913 A1 | 5/2011 | Haggerty | |
| 2011/0266090 A1 * | 11/2011 | Zwickler | 184/6.22 |
| 2012/0197510 A1 * | 8/2012 | Bernier et al. | 701/102 |

FOREIGN PATENT DOCUMENTS

| | | |
|---|---|---|
| DE | 10100556 A1 | 9/2001 |
| EP | 1231093 A2 | 8/2002 |
| EP | 2213497 A1 | 8/2010 |
| JP | 5953129 U | 4/1984 |
| JP | 07035156 U | 6/1995 |
| WO | 02057657 A1 | 7/2002 |

OTHER PUBLICATIONS

European Patent Office, Extended Search Report for corresponding European Patent Application No. 14150658.4 dated Apr. 10, 2014.

(Continued)

*Primary Examiner* — Justin Holmes
(74) *Attorney, Agent, or Firm* — Brooks Kushman P.C.

(57) ABSTRACT

An axle assembly and a method of control. The axle assembly may include a lubrication pump that may be operated to distribute lubricant in the axle assembly based on ambient air temperature and lubricant temperature or when a spinout condition is present.

20 Claims, 4 Drawing Sheets

(56) References Cited

OTHER PUBLICATIONS

Marco Bassi et al., "Drive Axle Assembly and Disengagement System" Filed: Sep. 30, 2011; 26 pages; U.S. Appl. No. 13/249,630.

European Patent Office, Partial European Search Report for the corresponding European Patent Application No. 14150658.4 dated Feb. 26, 2014.

* cited by examiner

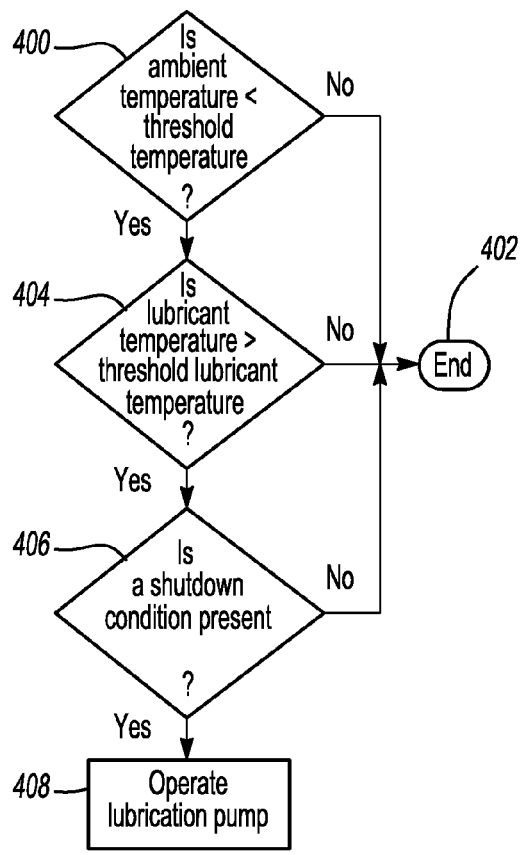
_Fig-4_
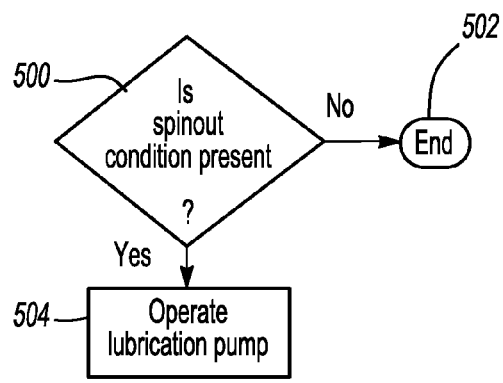
_Fig-5_

AXLE ASSEMBLY AND METHOD OF LUBRICATION CONTROL

TECHNICAL FIELD

This application relates to an axle assembly and a method of lubrication control.

BACKGROUND

A lubrication pump for an inter-axle differential is disclosed in U.S. Pat. No. 6,997,841.

SUMMARY

In at least one embodiment, a method of controlling an axle assembly is provided. The method may include operating a lubrication pump to distribute lubricant in the axle assembly when an ambient air temperature is less than a threshold ambient temperature value and a lubricant temperature is less than a threshold lubricant temperature value.

In at least one embodiment, a method of controlling an axle assembly of a vehicle is provided. The method may include determining when a spinout condition is present and operating a lubrication pump to distribute lubricant in the axle assembly when the spinout condition is present. The lubrication pump may not be driven by rotation of an input shaft of the axle assembly.

In at least one embodiment, an axle assembly for a vehicle is provided. The axle assembly may have an input shaft, an output shaft, an interaxle differential unit, and a lubrication pump. The input shaft may be configured to be rotated by a power source. The output shaft may be configured to provide torque to a second axle assembly. The interaxle differential unit may be operatively coupled to the input shaft and the output shaft and may be configured to compensate for rotational speed differences between the input shaft and the output shaft. The lubrication pump may distribute lubricant within the axle assembly and may operate independently of rotation of the input shaft.

BRIEF DESCRIPTION OF THE DRAWINGS

FIGS. 4 and 5 are flowchart of methods of controlling a lubrication pump of the axle assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
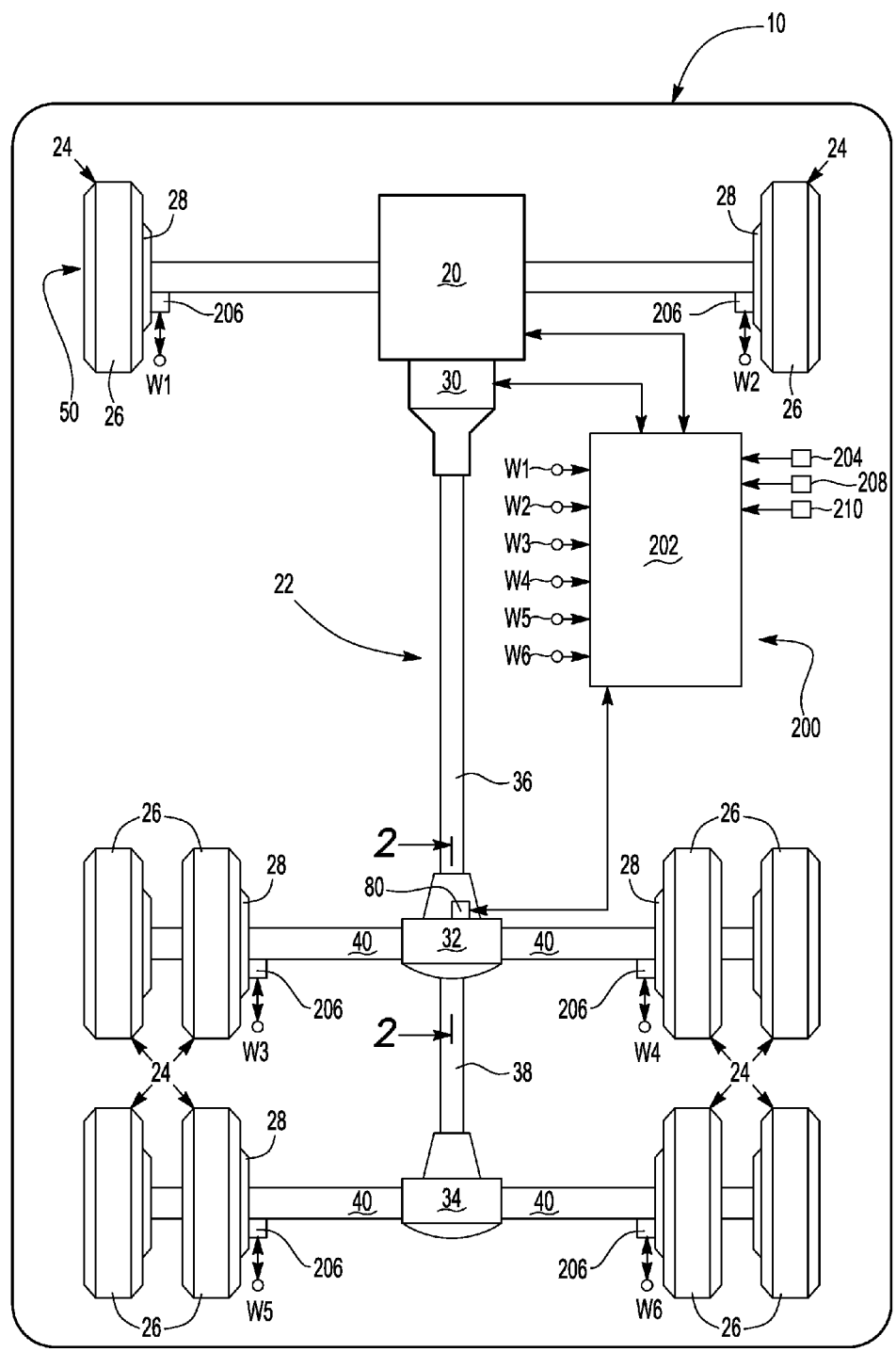
FIG. 1 is a schematic of an exemplary vehicle having an axle assembly.

Referring to FIG. 1, an exemplary vehicle 10 is shown. The vehicle 10 may be of any suitable type, such as a motor vehicle like a truck, bus, farm equipment, military transport or weaponry vehicle, or cargo loading equipment for land, air, or marine vessels. The vehicle 10 may include one or more power sources 20 and a drivetrain 22.

The power source 20 may provide power that may be used to rotate one or more traction wheels. In FIG. 1, a single power source 20 is shown that may be configured as an internal combustion engine that may be adapted to combust any suitable type of fuel, such as gasoline, diesel fuel, or hydrogen. Alternatively, multiple or different power sources may be provided, such as may be employed with a hybrid vehicle or electric vehicle. In such embodiments, a power source could be an electric power source, such as a battery, capacitor, or fuel cell, or a non-electric power source, such as a hydraulic power source.

The drivetrain 22 may be driven or powered by one or more power sources 20 and may provide torque to one or more traction wheel assemblies 24 that may include a tire 26 mounted on a wheel 28. The drivetrain 22 may include a transmission 30 and one or more axle assemblies. In the embodiment shown, a tandem axle configuration is shown that includes a first axle assembly 32 and a second axle assembly 34. The first axle assembly 32 may be referred to as a forward-rear axle assembly. The second axle assembly 34 may be referred to as a rear-rear axle assembly. Optionally, additional axle assemblies may be provided that may be coupled together in series.

Torque may be transmitted through the drivetrain 22 in the following manner. The power source 20 may be operatively coupled to the input of the transmission 30. An output of the transmission 30 may be coupled to an input of the first axle assembly 32, such as with a drive shaft 36. An output of the first axle assembly 32 may be selectively coupled to an input of the second axle assembly 34 via a prop shaft 38.

The first and second axle assemblies 32, 34 may each have a plurality of outputs that may be coupled to one or more wheel assemblies 24. In the embodiment shown, the first and second axle assemblies 32, 34 each have a pair of wheel axle output shafts. Each wheel axle output shaft may be selectively or non-selectively coupled to a corresponding wheel axle 40 or half-shaft upon which one or more wheel assemblies 24 may be disposed.

The vehicle 10 may also include a front axle assembly 50 that may be configured to steer the vehicle 10. The front axle assembly 50 may or may not be configured as a drive axle that may provide torque to at least one associated wheel assembly 24.

Figure 2:
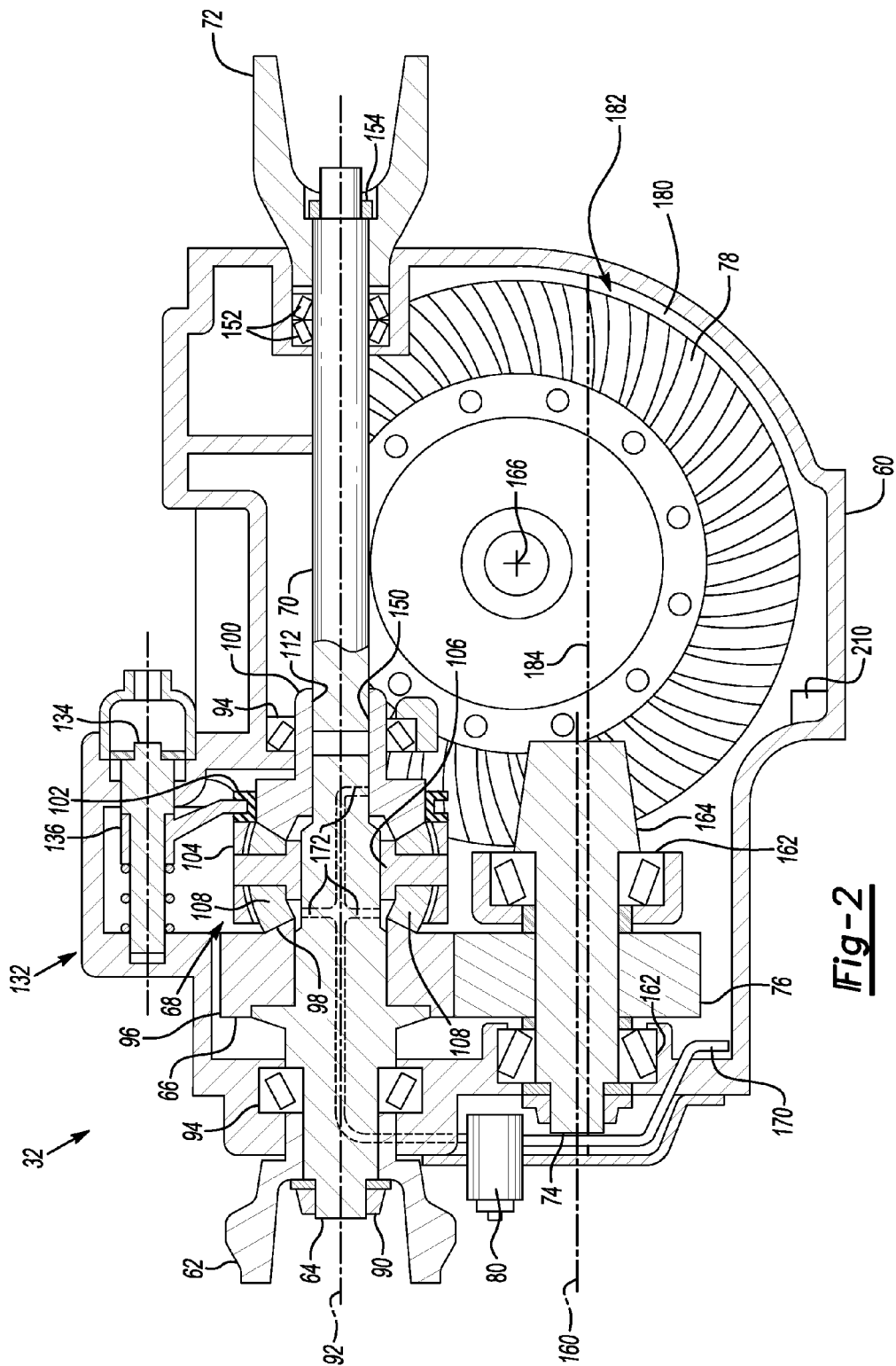
FIG. 2 is a cross section of an axle assembly along section line 2-2.
Figure 3:
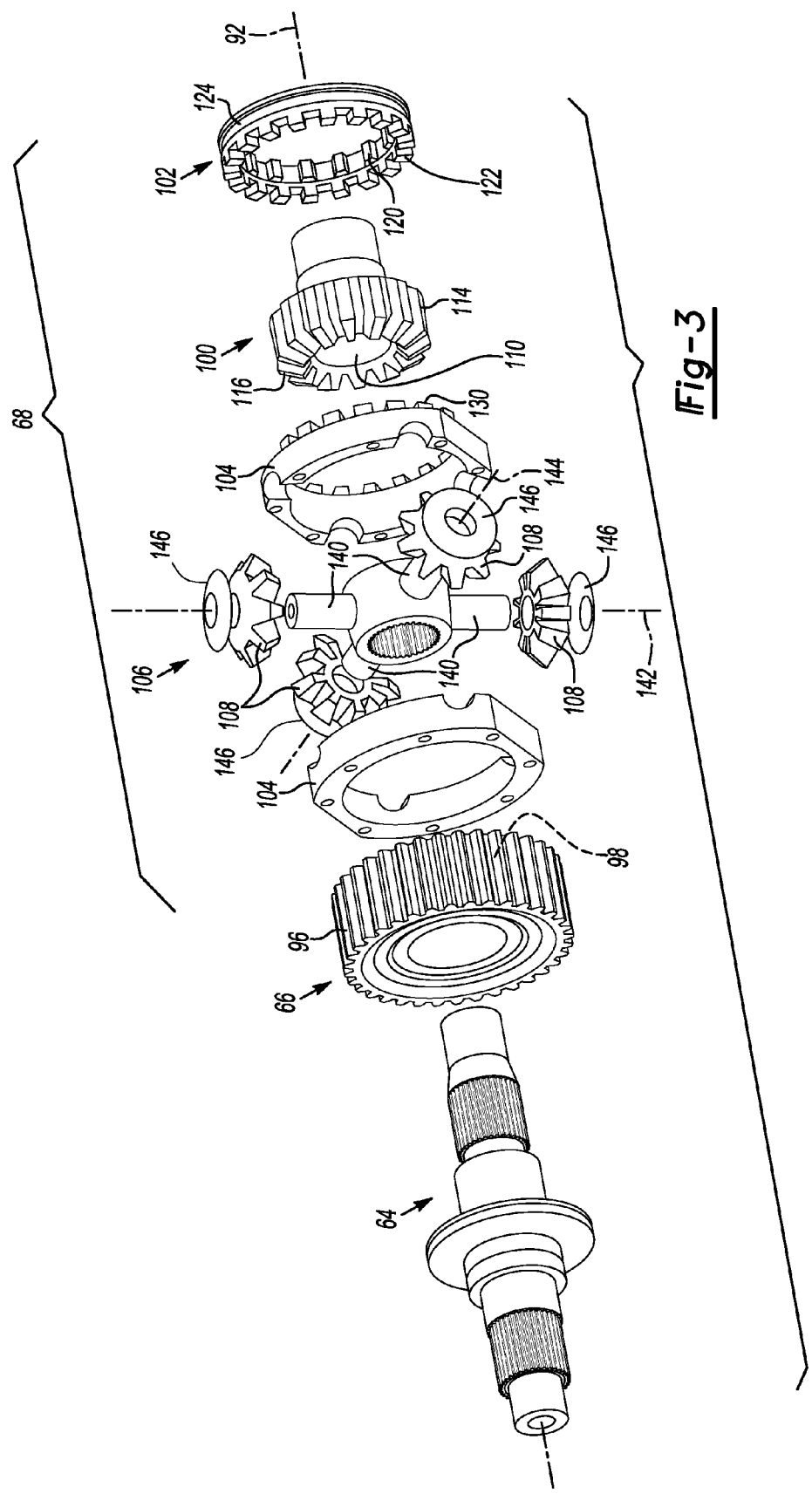
FIG. 3 is an exploded perspective view of an interaxle differential unit of the axle assembly.

Referring to FIGS. 2 and 3, the first axle assembly 32 is shown in more detail. The first axle assembly 32 may be configured to provide torque to its associated wheel assemblies 24 via the wheel axles 40 and to selectively provide torque to the second axle assembly 34. The first axle assembly 32 may include a housing 60, an input yoke 62, an input shaft 64, a drive gear 66, an interaxle differential unit 68, an output shaft 70, an output yoke 72, a pinion 74, a driven gear 76, a ring gear 78, and a lubrication pump 80.

The housing 60 may receive various components of the first axle assembly 32. In addition, the housing 60 may facilitate mounting of the first axle assembly 32 to the vehicle 10.

The input yoke 62 may facilitate coupling of the first axle assembly 32 to the drive shaft 36. The input yoke 62 may be coupled to the drive shaft 36 in any suitable manner, such as with a universal joint. The input yoke 62 may also be fixedly coupled to the input shaft 64. For instance, the input yoke 62 may include a center bore that may receive an end of the input shaft 64. The center bore and the input shaft 64 may be provided with mating splines that may help align and secure the input yoke 62 to the input shaft 64. A fastener 90, such as a nut, may be threaded onto an end of the input shaft 64 to further secure and inhibit removal of the input yoke 62 from the input shaft 64.

The input shaft 64 may be configured to rotate about a first axis of rotation 92. For instance, the input shaft 64 may be supported by one or more bearings 94 that may be disposed in the housing 60. The bearings 94 may facilitate rotation of the input shaft 64 while inhibiting axial movement of the input shaft 64 along the first axis of rotation 92. The input shaft 64 may be located above the pinion 74 as will be described in more detail below. In addition, a portion of the input shaft 64 may be hollow and may be configured to receive and store lubricant or act as a lubricant reservoir in one or more embodiments.

The drive gear 66 may be disposed on an exterior surface of the input shaft 64. In at least one embodiment, the drive gear 66 may have a substantially smooth center bore that may receive the input shaft 64 and may allow the drive gear 66 to rotate about or with respect to the input shaft 64 under certain operating conditions. The drive gear 66 may include a first drive gear portion 96 and a second drive gear portion 98. The first drive gear portion 96 may include a plurality of teeth that may be arranged around an outside diameter of the drive gear 66. The second drive gear portion 98 may include a set of teeth that may be arranged on a side or face of the drive gear 66 that faces toward the interaxle differential unit 68. In at least one embodiment, the second drive gear portion 98 may also have a radial tooth configuration in which the teeth of the second drive gear portion 98 are disposed opposite the teeth of the first drive gear portion 96 such that the ends of the teeth face toward the interaxle differential unit 68. The second drive gear portion 98 may also be referred to as a face gear portion of the drive gear 66.

The interaxle differential unit 68 may be disposed in the housing 60 on the input shaft 64. The interaxle differential unit 68 may be configured to compensate for speed differences between the first axle assembly 32 and the second axle assembly 34. The interaxle differential unit 68 may include an output gear 100, a lock collar 102, a case 104, a spider 106, and a plurality of pinion gears 108.

The output gear 100 may be disposed proximate an exterior surface of the input shaft 64. For example, the output gear 100 may extend along the first axis of rotation 92 and may have a center bore 110. A portion of the center bore 110 may receive and/or support an end of the input shaft 64. In various embodiments, an end of the input shaft 64 may be disposed in the center bore 110 and optionally a bearing may be provided between the input shaft 64 and center bore 110 to facilitate alignment and rotation. The center bore 110 may also include a spline 112 that may be spaced apart from the input shaft 64 and that may receive and engage a corresponding spline on the output shaft 70. The output gear 100 may also include a first output gear portion 114 and a second output gear portion 116. The first output gear portion 114 may include a plurality of teeth that may be arranged around an outside diameter of the output gear 100 for mating with the lock collar 102. The second output gear portion 116 may include a set of teeth that may be arranged on a side or face of the output gear 100 that faces toward the spider 106 and pinion gears 108. The second output gear portion 116 may also be referred to as a face gear portion of the output gear 100.

The lock collar 102 may be moveably disposed on the output gear 100. The lock collar 102 may be generally ring-shaped and may include a first gear portion 120, a second gear portion 122, and an annular groove 124. The first gear portion 120 may include a plurality of teeth that may be arranged on an inside diameter of the lock collar 102 for mating with the first output gear portion 114. The second gear portion 122 may include a set of teeth that are arranged on a side or face of the lock collar 102 that faces toward the case 104. The annular groove 124 may be spaced apart from the first and second gear portions 120, 122. The annular groove 124 may extend continuously around the lock collar 102 and may receive a linkage as will be described in more detail below.

The case 104 may receive various components of the interaxle differential unit 68. In the embodiment shown, the case 104 has a two piece construction. The case 104 may be spaced apart from the housing 60, the drive gear 66, and the output gear 100 to facilitate rotation with respect to these components. The case 104 may include a case gear portion 130 that may include a set of teeth that may be arranged on a side or face of the case 104 that faces toward the lock collar 102. The case gear portion 130 may selectively engage the second gear portion 122 of the lock collar 102. More specifically, the case gear portion 130 may engage the second gear portion 122 when the lock collar 102 is in a locked position and may be spaced apart from the second gear portion 122 when the lock collar 102 is in an unlocked position. In the locked position, the output gear 100 and input shaft 64 rotate together about the first axis of rotation 92. More specifically, the input shaft 64 rotates the spider 106 which rotates the case 104 which rotates the lock collar 102 which rotates the output gear 100. In the unlocked position, the output gear 100 and input shaft 64 may not rotate together about the first axis of rotation 92. More specifically, the disconnection between the lock collar 102 and the case 104 may allow the output gear 100 to rotate at a different rotational velocity than the input shaft 64.

Positioning of the lock collar 102 may be facilitated by a lock collar actuator unit 132. The lock collar actuator unit 132 may include an actuator 134. The actuator 134 may be of any suitable type, such as a pneumatic, hydraulic, vacuum, mechanical, electrical, or electromechanical actuator. The actuator 134 may be coupled to lock collar 102 via a linkage 136, such as a fork, that may have a first end that may be received in the annular groove 124 of the lock collar 102 and a second end that may be operatively coupled to or may engage the actuator 134.

The spider 106 may be generally disposed in the case 104 and may be fixedly disposed on the input shaft 64. For instance, the spider 106 may include a center bore that may include splines that mate with corresponding splines on the input shaft 64 to help align and secure the spider 106 to the input shaft 64. As such, the spider 106 may rotate about the first axis of rotation 92 with the input shaft 64. The spider 106 may also include a set of pins 140. The pins 140 may extend away from the center bore and may be arranged along a first axis 142 and a second axis 144. The first axis 142 and the second axis 144 may intersect and may be disposed substantially perpendicular to each other and substantially perpendicular to the axis of rotation 92. Ends of the pins 140 may be received by the case 104 and may be spaced apart from the housing 60 so as not to interfere with rotation of the interaxle differential unit 68.

A pinion gear 108 may be rotatably disposed on each pin 140. Each pinion gear 108 may be generally disposed in the case 104 and may be retained on a corresponding pin 140 with a fastener 146, such as a thrust washer that may be coupled to or may engage the case 104. In the embodiment shown, two pinion gears 108 may rotate about pins 140 that extend along the first axis 142 and two pinion gears 108 may rotate about pins 140 that extend along the second axis 144. Each pinion gear 108 may include a set of teeth that mate with the second drive gear portion 98 of the drive gear 66 and mate with the second output gear portion 116 of the output gear 100.

Referring to FIG. 2, the output shaft 70 may extend along and may be configured to rotate about the first axis of rotation 92. The output shaft 70 may have a first end and a second end. The first end may be spaced apart from the input shaft 64 by a gap. In addition, the first end of the output shaft 70 may have a spline 150 disposed along an exterior surface. The teeth of the spline 150 may extend substantially parallel to the first axis of rotation 92 and may be configured to engage and mate with the teeth of the spline 112 in the center bore 110 of the output gear 100. As such, these mating splines may rotatably couple the output shaft 70 to the output gear 100. The output shaft 70 may be supported by one or more bearings 152 that may be disposed in the housing 60. The bearings 152 may facilitate rotation of the output shaft 70 while inhibiting axial movement along the first axis of rotation 92.

The output yoke 72 may facilitate coupling of the first axle assembly 32 to the prop shaft 38. The output yoke 72 may be coupled to the prop shaft 38 in any suitable manner, such as with a universal joint. The output yoke 72 may be fixedly positioned on or with respect to the output shaft 70. For instance, the output yoke 72 may include a center bore that may receive an end of the output shaft 70. The center bore and the output shaft 70 may be provided with mating splines that may help align and secure the output yoke 72 to the output shaft 70. A fastener 154, such as a nut, may be threaded onto an end of the output shaft 70 to further secure and inhibit removal of the output yoke 72 from the output shaft 70.

The pinion 74 may be spaced apart from the input shaft 64 and may be configured to rotate about a second axis of rotation 160. For instance, the pinion 74 may be supported by one or more bearings 162 that may be disposed on the housing 60. The bearings 162 may facilitate rotation of the pinion 74 while inhibiting axial movement of the pinion 74 along the second axis of rotation 160. In at least one embodiment, the first and second axes of rotation 92, 160 may be spaced apart and extend substantially parallel to each other. A pinion gear 164 may be disposed at an end of the pinion 74. The pinion gear 164 may be integrally formed with the pinion 74 and may include a set of teeth that mate with corresponding teeth on one or more ring gears 78. The ring gear 78 may be configured to rotate about a third axis of rotation 166 and may be coupled to a wheel axle output shaft or wheel axle 40 of the first axle assembly 32. The pinion 74 and/or second axis of rotation 160 may be positioned below the third axis of rotation 166. Moreover, the input shaft 64, interaxle differential unit 68, output shaft 70, and other components disposed along the first axis of rotation 92 may be positioned above the pinion 74 and the second and third axes of rotation 160, 166 in one or more embodiments. This "high entry" configuration may position these components above lubricant that may accumulate in the bottom of the housing 60, thereby reducing or avoiding frictional drag with the lubricant that may otherwise reduce operational efficiency of the first axle assembly 32.

The driven gear 76 may be fixedly disposed on an exterior surface of the pinion 74. The driven gear 76 may include a plurality of teeth that may be generally arranged about an outside diameter of the driven gear 76 for mating with the drive gear 66.

The lubrication pump 80 may be configured to pump, circulate or distribute lubricant within the housing 60. The lubrication pump 80 may be an electrically powered lubrication pump and may not be mechanically driven by an axle assembly or rotation of the input shaft 64 or output shaft 70. As such, the lubrication pump 80 may be operated in conditions where the pinion 74 does not rotate and splash lubricant inside the housing 60, such as when the vehicle 10 is turned off, the engine is not running, and/or when the vehicle 10 is not in motion. In such conditions, the input shaft 64 and output shaft 70 of the first axle assembly 32 may not rotate. In addition, such a lubrication pump 80 may improve packaging flexibility and reduce drag forces on the drivetrain 22 as compared to a mechanically driven pump, such as may be powered by the input shaft 64 and/or output shaft 70.

The lubrication pump 80 may be disposed proximate the first axle assembly 32. In FIG. 2, the lubrication pump 80 is shown extending through the housing 60, but may be disposed completely inside the housing 60 or external to the housing 60 in one or more embodiments. As such, the lubrication pump 80 may not be mounted between the input shaft 64 and the output shaft 70. The lubrication pump 80 may have or may be connected to at least one inlet fluid passage 170 and at least one outlet fluid passage 172.

One or more inlet fluid passages 170 may be fluidly coupled to an inlet of the lubrication pump 80. The inlet fluid passage 170 may be configured as a hose, tube, channel, opening, or passage that may receive a lubricant 180, such as oil, that may flow down the sides of the housing 60 and gather or collect in a sump portion 182 or axle sump of the first axle assembly 32. For example, the inlet fluid passage 170 or a portion thereof may be integrally formed with the housing 60 or may be configured as a separate component that is provided to route lubricant. The sump portion 182 may be disposed proximate the bottom of the housing 60. A representative static lubricant level 184 that may represent lubricant that accumulates in the sump portion 182 is represented by the dashed line in FIG. 2. The static lubricant level 184 may be disposed below the second axis of rotation 160 in one or more embodiments. In addition, a filter may be provided with the inlet fluid passage 170 to help inhibit particulates from entering the lubrication pump 80 or being distributed to moving components of the first axle assembly 32.

One or more outlet fluid passages 172 may be fluidly coupled to an outlet of the lubrication pump 80. In FIG. 2, a plurality of outlet fluid passages 172 are shown that are hidden behind the input shaft 64; however, the outlet fluid passages 172 may be provided in other locations. An outlet fluid passage 172 may be configured as a hose, tube, channel, opening, or passage that may direct lubricant 180 to one or more desired locations in the first axle assembly 32. For example, one or more outlet fluid passages 172 may spray or direct lubricant 180 to moving components of the first axle assembly 32 that may be disposed above the static lubricant level 184, such as the input shaft 64 and/or components and gears of the interaxle differential unit 68. Optionally, an outlet fluid passage 172 may provide lubricant to a lubricant reservoir in the input shaft 64 which may have outlet fluid passages that distribute lubricant to such components. An outlet fluid passage 172 or a portion thereof may be integrally formed with the housing 60 or may be configured as a separate component that is provided to route lubricant. An outlet fluid passage 172 may also be configured to store lubricant 180, thereby reducing the response time for providing lubricant 180 to a desired location. Lubricant 180 may also be stored under pressure. For example, an outlet fluid passage 172 may be a bladder or may include one or more valves that may be closed to accumulate pressurized lubricant and opened to release and distribute pressurized lubricant to one or more axle assembly components independent of operation of the lubrication pump 80.

Referring to FIG. 1, the vehicle 10 may also include a control system 200 that may monitor and control operation of various vehicle systems and components. The control system 200 may include one or more microprocessor-based controllers or control modules 202 that may communicate with various components or subsystems of the vehicle 10 as represented by the arrowed lines in FIG. 1. For example, the control system 200 may be electrically connected to or wirelessly communicate with components of the drivetrain 22, such as the power source 20 and the transmission 30, and components of the first axle assembly 32 to monitor and control their operation and performance. In addition, the control system 200 may also process input signals or data from various input devices or sensors. Some input devices that may be provided with the vehicle 10 may include an ignition sensor 204, a speed sensor 206, an ambient air temperature sensor 208, and a lubricant temperature sensor 210.

The ignition sensor 204 may provide data indicative of a "key-on" or operating state of the vehicle 10. For example, the ignition sensor 204 may be used to determine whether the power source 20 or engine is running or the vehicle 10 is operational.

The speed sensor 206 may be provided to detect or provide data indicative of the speed of the vehicle 10. The speed sensor 206 may be of any suitable type. For example, the speed sensor 206 may be configured as a wheel speed sensor that detects the rotation speed of a wheel assembly 24 or associated wheel axle 40. Data from the speed sensor 206 may also be used to determine a distance of travel of the vehicle 10. For instance, distance of travel may be based on tire size (e.g., tire diameter) and the rotational distance or number of revolutions detected by the speed sensor 206. In at least one embodiment, a speed sensor 206 may be associated with each wheel assembly 24 or wheel axle 40, such as may be provided with an anti-lock brake system (ABS) or traction control system. As such, the speed sensor 206 may detect wheel slip or unexpected rotation of a wheel assembly 24 in a manner known by those skilled in the art. Communication between the control system 200 and each speed sensor 206 is represented by connection nodes W1 through W6 in FIG. 1.

The ambient air temperature sensor 208 may detect or provide data indicative of a temperature of ambient air in the environment surrounding or in proximity to the vehicle 10. The ambient air temperature sensor 208 may be a physical sensor that may be disposed on the vehicle 10 or a virtual sensor. For example, a virtual ambient air temperature sensor may be based on temperature data that may be wirelessly transmitted to the vehicle 10. Such temperature data may be based on the location of the vehicle 10, which may be provided by a global positioning system (GPS) or other location telemetric data.

The lubricant temperature sensor 210 may detect or provide data indicative of a temperature of a lubricant, such as oil, disposed in the first axle assembly 32. The lubricant temperature sensor 210 may be disposed in or near the sump portion 182 of the first axle assembly 32 as is shown in FIG. 2.

Referring to FIGS. 4 and 5, flowcharts of exemplary methods of controlling an axle assembly are shown. As will be appreciated by one of ordinary skill in the art, the flowcharts may represent control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multi-tasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. In at least one embodiment, a method may be executed by the control system 200 and may be implemented as a closed loop control system. The illustrated functions may be modified, or in some cases omitted, without departing from the spirit or scope of the present invention.

Referring to FIG. 4, a first method of control is illustrated.

At block 400, the method may determine whether the ambient air temperature is less than a threshold ambient temperature value. The ambient air temperature may be based on data from the ambient air temperature sensor 208. The threshold ambient temperature value may be established based on vehicle development testing. For example, the threshold ambient temperature value may be indicative cold weather conditions, such as near or below 0° C. in one or more embodiments. Such cold weather conditions may rapidly cool the lubricant 180 in a drive axle assembly. More specifically, lubricant used in heavy duty drive axle assemblies may have high viscosity near and below freezing temperatures, which makes pumping the lubricant difficult. If the ambient air temperature is not less than the threshold ambient temperature value, then the method may repeat or end at block 402. If the ambient air temperature is less than the threshold ambient temperature value, then the method may continue at block 404.

At block 404, the temperature of the lubricant may be compared to a threshold lubricant temperature value. The lubricant temperature may be based on data from the lubricant temperature sensor 210. The threshold lubricant temperature value may be established based on vehicle development testing and may be greater than the threshold ambient temperature value. Lubricant temperature may increase during or due to operation of the axle assembly in that frictional heat from rotating components may be transferred to the lubricant 180. As such, this step may determine whether the lubricant temperature is sufficiently high as to reduce the lubricant viscosity and make the lubricant easier to pump (e.g., reduce the current or power needed to operate the lubrication pump 80). If the lubricant temperature is not greater than the threshold lubricant temperature value, then the method may repeat or end at block 402. If the lubricant temperature is greater than the threshold lubricant temperature value, then the method may continue at block 406.

At block 406, the method may determine whether a shutdown condition is present or detected. A shutdown condition may be present when the vehicle is turned off or one or more power sources 20 are not operational. The detection of a shutdown condition may be based on data from the ignition sensor 204 or components of the drivetrain 22. If a shutdown condition is not present, then the method may repeat or end at block 402. If a shutdown condition is present, then the method may continue at block 408.

At block 408, the lubrication pump 80 may be turned on to pump lubricant to axle assembly components, such as the input shaft 64 and/or components of the interaxle differential unit 68. The lubrication pump 80 may be operated for a predetermined amount of time or pump a predetermined volume of lubricant. As such, lubricant may be distributed to axle assembly components when the vehicle is not being propelled and when the lubricant is "hot" and easier to pump and the ambient temperature is "cold" to make lubricant available to axle assembly components prior to initiating or reinitiating operation of the axle assembly.

Referring to FIG. 5, a second method of control is illustrated.

At block 500, the method may determine whether a spinout condition is present or detected. A spinout condition may be present when the second axle assembly 34 is operating at a substantially higher rotational speed than the first axle assembly 32. As such, one or more wheel assemblies of the second axle assembly 34 may be slipping or "spinning out" which in turn may cause the output shaft 70 and portions of the interaxle differential unit 68, such as the output gear 100 and pinion gears 108, to rotate at a much higher velocity than the input shaft 64. The increased rotational velocity may increase the desired amount of lubricant 180 to provide to these components.

A spinout condition may be detected by directly or indirectly comparing the rotational speeds or rotational velocities of the input shaft 64 and output shaft 70. For example, the difference between the rotational velocity of the input shaft 64 and the rotational velocity of the output shaft 70 may be compared to a threshold rotational speed value. If the difference between the rotational velocity of the input shaft 64 and the rotational velocity of the output shaft 70 (or absolute value of the difference) is greater than the threshold rotational speed value, then a spinout condition may be present.

The rotational speed of the input shaft 64 and/or output shaft 70 may be directly detected with a speed sensor that may directly detect the rotational speed of the input shaft 64 or output shaft 70. Alternatively, the rotational speed of the input shaft 64 may be indirectly detected based on the rotational speed of another component connected to the input shaft 64 upstream of the output shaft 70, such as an engine speed sensor, driveshaft speed sensor, pinion speed sensor, or speed sensor 206 associated with one or more wheels of the first axle assembly 32 or the front axle assembly 50. The rotational speed of the output shaft 70 may be indirectly detected based on the rotational speed of another component connected to the output shaft 70 downstream of the input shaft 64, such as a prop shaft speed sensor, pinion speed sensor of the second axle assembly 34, or speed sensor 206 associated with one or more wheels of the second axle assembly 34. Data from such sensors may be filtered to determine whether a spinout condition is present for a sufficient period of time. For example, statistical techniques such as a moving average may be employed to filter and aggregate sensor data. Moreover, wheel speed data from one or more speed sensors 206 associated with a common axle assembly may be averaged or filtered to estimate or obtain values indicative of input shaft speed and/or output shaft speed. If a spinout condition is not present, then the method may repeat or end at block 502. If a spinout condition is present, then the method may continue at block 504.

At block 504, the lubrication pump 80 may be turned on to pump lubricant to axle assembly components, such as the input shaft 64 and/or components of the interaxle differential unit 68. The lubrication pump 80 may be operated for a predetermined amount of time, a predetermined vehicle travel distance, and/or pump a predetermined volume of lubricant. In addition, the lubrication pump 80 may be operated based on the amount of time the vehicle has been "on" or running (e.g., not shutdown) and/or based on engine torque usage history. A predetermined vehicle travel distance may be based on rotation revolutions of a wheel assembly 24. As such, lubricant may be distributed to axle assembly components, such as the interaxle differential unit 68, when lubricant demands are high due to high differential rotational speeds and/or when splash lubrication from the pinion 74 may be insufficient. For example, the interaxle differential unit 68 may not receive sufficient splash lubrication from spinning gears at low rotational speeds. Insufficient lubrication may result in fretting wear of gear teeth of the interaxle differential unit 68 (e.g., wear primarily due to loading and rubbing of gear teeth surfaces rather than due to gear rotation). Providing lubricant with a lubrication pump 80 may refresh the lubrication film on gear teeth surfaces and/or flush out particulates that may exacerbate wear. Moreover, use of a lubrication pump 80 may help improve or provide flexibility in designing an axle assembly in that the axle assembly does not need to be designed by trial and error to insure that splashing lubricant is directed to the interaxle differential unit 68 throughout the range of operating conditions of the axle assembly and for different types of lubricant that may be used in the axle assembly.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly for a vehicle comprising:
an input shaft configured to be rotated by a power source;
an output shaft that is configured to provide torque to a second axle assembly;
an interaxle differential unit that is operatively coupled to the input shaft and the output shaft and configured to compensate for rotational speed differences between the input shaft and the output shaft; and
a lubrication pump that distributes lubricant within the axle assembly, wherein the lubrication pump operates independently of rotation of the input shaft and wherein the lubrication pump operates when a difference between a rotational speed of the output shaft and a rotational speed of the input shaft exceeds a threshold rotational speed value.

2. The axle assembly of claim 1 wherein the lubrication pump is disposed on a housing of the axle assembly and has an inlet fluid passage that receives lubricant from a sump portion of the axle assembly and an outlet fluid passage that provides lubricant proximate the interaxle differential unit.

3. The axle assembly of claim 1 wherein the lubrication pump is an electric lubrication pump that is not driven by the input shaft of the axle assembly.

4. The axle assembly of claim 1 wherein the lubrication pump is not disposed between the input shaft and the output shaft and pumps lubricant when the input shaft is not rotated.

5. The axle assembly of claim 1 wherein the rotational speed of the input shaft is detected by a speed sensor of the axle assembly and the rotational speed of the output shaft is based on a speed sensor of the second axle assembly.

6. The axle assembly of claim 1 wherein the lubrication pump provides lubricant to the interaxle differential unit for a predetermined period of time.

7. The axle assembly of claim 1 wherein the lubrication pump provides lubricant to the interaxle differential unit for a predetermined vehicle travel distance.

8. The axle assembly of claim 7 further comprising a speed sensor that provides data indicative of a distance of travel of the vehicle and wherein the lubrication pump does not provide lubricant to the interaxle differential unit when the distance of travel exceeds the predetermined vehicle travel distance.

9. The axle assembly of claim 1 further comprising a sump portion disposed proximate a bottom of a housing of the axle assembly, an inlet fluid passage that is fluidly connected to an inlet of the lubrication pump, and an outlet fluid passage that is fluidly coupled to an outlet of the lubrication pump, wherein the inlet fluid passage receives lubricant from the sump portion.

10. The axle assembly of claim 9 wherein the inlet fluid passage is disposed below the outlet fluid passage.

11. The axle assembly of claim 10 wherein the inlet fluid passage is disposed below a static lubricant level.

12. The axle assembly of claim 9 wherein the outlet fluid passage sprays lubricant on the interaxle differential unit.

13. The axle assembly of claim 9 wherein the inlet fluid passage is integrally formed with the housing.

14. The axle assembly of claim 9 wherein the outlet fluid passage is integrally formed with the housing.

15. An axle assembly for a vehicle comprising:
an input shaft configured to be rotated by a power source;
an output shaft that is configured to provide torque to a second axle assembly;
an interaxle differential unit that is operatively coupled to the input shaft and the output shaft and configured to compensate for rotational speed differences between the input shaft and the output shaft; and
a lubrication pump that distributes lubricant within the axle assembly, wherein the lubrication pump operates independently of rotation of the input shaft and wherein the lubrication pump distributes lubricant in the axle assembly when an ambient air temperature is less than a threshold ambient temperature value and a lubricant temperature is greater than a threshold lubricant temperature value.

16. The axle assembly of claim 15 further comprising a pinion that is spaced apart from the input shaft and that rotates about a second axis of rotation, wherein the lubrication pump operates when the pinion does not rotate.

17. The axle assembly of claim 15 wherein the lubrication pump operates when the input shaft and the output shaft do not rotate.

18. The axle assembly of claim 15 wherein the lubrication pump operates when the vehicle is turned off.

19. An axle assembly for a vehicle comprising:
an input shaft configured to be rotated by a power source;
an output shaft that is configured to provide torque to a second axle assembly;
an interaxle differential unit that is operatively coupled to the input shaft and the output shaft and configured to compensate for rotational speed differences between the input shaft and the output shaft; and
a lubrication pump that distributes lubricant within the axle assembly, wherein the lubrication pump operates independently of rotation of the input shaft and wherein the lubrication pump provides lubricant to the interaxle differential unit for a predetermined period of time.

20. An axle assembly for a vehicle comprising:
an input shaft configured to be rotated by a power source;
an output shaft that is configured to provide torque to a second axle assembly;
an interaxle differential unit that is operatively coupled to the input shaft and the output shaft and configured to compensate for rotational speed differences between the input shaft and the output shaft; and
a lubrication pump that distributes lubricant within the axle assembly, wherein the lubrication pump operates independently of rotation of the input shaft and wherein the lubrication pump provides lubricant to the interaxle differential unit for a predetermined vehicle travel distance.

* * * * *